(12) United States Patent
Willey

(10) Patent No.: US 7,374,294 B2
(45) Date of Patent: May 20, 2008

(54) METHOD AND APPARATUS FOR IMPROVING IMAGE QUALITY IN A REFLECTING TELESCOPE

(76) Inventor: Gerald Willey, 1310 S. 4th St., DeKalb, IL (US) 60115

( * ) Notice: Subject to any disclaimer, the term of this patent is extended or adjusted under 35 U.S.C. 154(b) by 0 days.

(21) Appl. No.: 11/592,373

(22) Filed: Nov. 3, 2006

(65) Prior Publication Data

US 2007/0097500 A1    May 3, 2007

Related U.S. Application Data

(60) Provisional application No. 60/733,027, filed on Nov. 3, 2005.

(51) Int. Cl.
   *B60R 1/06*    (2006.01)
   *G02B 23/00*   (2006.01)
(52) U.S. Cl. .................. 359/507; 359/399; 359/509
(58) Field of Classification Search ........ 359/399–409, 359/896, 364–366, 838, 507–512, 894, 900
   See application file for complete search history.

(56) References Cited

U.S. PATENT DOCUMENTS

| 4,561,732 A | * | 12/1985 | Japes ......................... 359/509 |
| 4,979,809 A | * | 12/1990 | Peters ........................ 359/509 |
| 2006/0209543 A1 | * | 9/2006 | Taguchi et al. ............. 362/253 |

FOREIGN PATENT DOCUMENTS

| DE | 40 22 085 | * | 1/1992 | ................. 359/507 |
| JP | 57-201306 | * | 12/1982 | ................. 359/896 |
| JP | 61-184902 | * | 8/1986 | ................. 359/399 |

OTHER PUBLICATIONS

English translation of the Germany reference No. DE 40 22 085 A1.*
Bryan Greer; "Understanding Thermal Behavior in Newtonian Reflectors"; Sky & Telescope magazine; Sep. 2000; pp. 125-133.
Alan Adler; "Thermal Management in Newtonian Reflectors"; Sky & Telescope magazine; Jan. 2002; pp. 132-136.

* cited by examiner

*Primary Examiner*—Thong Nguyen
(74) *Attorney, Agent, or Firm*—Reinhart Boerner Van Deuren P.C.

(57) ABSTRACT

A method and apparatus for improving image quality in a reflector-type telescope are provided, through utilization of one or more nozzles disposed about the periphery of a reflecting mirror of the telescope, for directing a flow of air from a backside of the mirror across a concave reflecting surface of the mirror, to thereby sweep away and/or preclude formation of image distorting thermal boundary layers, or other impediments to image quality, resulting from the mirror not being in thermal equilibrium with ambient air surrounding the mirror. Supply nozzles are provided around a portion of the periphery of the mirror, and exhaust pick-up nozzles are provided around another portion of the periphery of the mirror, to thereby cause a flow of air to closely adhere to the concave surface of the mirror.

11 Claims, 3 Drawing Sheets

METHOD AND APPARATUS FOR IMPROVING IMAGE QUALITY IN A REFLECTING TELESCOPE

CROSS-REFERENCE TO RELATED PATENT APPLICATIONS

This patent application claims the benefit of U.S. Provisional Patent Application No. 60/733,027, filed Nov. 3, 2005, the disclosure and teachings of which are incorporated herein, in their entirety, by reference.

FIELD OF THE INVENTION

This invention relates to telescopes, and more particularly to a method and apparatus for improving image clarity of a reflecting telescope operating under conditions where a mirror of the reflecting telescope is not in thermal equilibrium with ambient air adjacent the mirror.

BACKGROUND OF THE INVENTION

In a typical Newtonain reflector-type telescope, a mirror, having a concave face, is located at one end of an elongated tube, or frame, and adjusted such that the concave face of the mirror will reflect and focus an image for viewing through an eyepiece axially disposed from the concave face of the mirror at an open end of the tube or frame of the telescope. By virtue of this arrangement, light entering the open end of the telescope from a distant object, such as a star or planet, is focused by the mirror and magnified by the eyepiece in such a manner that the distant object may be clearly viewed in a magnified state through the eyepiece.

It is well known that the image quality which can be achieved in a Newtonian reflector-type telescope is affected significantly by thermal boundary layers, created adjacent the concave surface of the mirror, when the mirror is at a temperature higher than the ambient air surrounding the mirror. Light from the distant object must pass through this boundary layer twice, once while approaching the mirror, and a second time after being reflected by the mirror, before reaching the focal point at the eyepiece. This phenomenon is discussed in significant detail, and a number of photographic and graphical illustrations are provided, in Attachment 1 to U. S. Provisional application, No. 60/733,027, the benefit of which is claimed herein, in an article from the September 2000 issue of Sky and Telescope magazine, entitled "Understanding Thermal Behavior in Newtonian Reflectors", by author Bryan Greer.

In order to achieve an optimal image, with a given reflector telescope, therefore, it is necessary that the mirror be allowed to reach thermal equilibrium with ambient air surrounding the mirror. For a telescope which is normally stored inside of a building at an elevated temperature, it can typically take two to three hours or more for the mirror of the telescope to reach thermal equilibrium with the surrounding ambient air, after the telescope is moved outdoors for viewing stars and/or planets, for example. Having to wait this long in order to utilize the telescope is a source of considerable frustration to astronomers and star gazers. The problem of achieving thermal equilibrium is further exacerbated, in areas of the country where the ambient air drops significantly after sundown, such as in desert areas, where the nighttime temperature can easily drop ten to fifteen degrees in the hours after sunset. Where the mirror is of a large diameter, of six to eight inches or more, for example, the mirror may have too much mass to ever reach equilibrium with ambient air temperature, even in a non-desert area, during the nighttime hours.

The article by Greer provides a number of suggestions for designing a reflector-type telescope in a manner which will reduce the length of time required for cool-down of the mirror. Greer suggests utilizing a fan directed at the backside of the mirror, in a manner utilized in large Newtonian telescopes, for shortening cool-down times in smaller, portable, reflector-type telescopes.

The findings and suggestions of Greer are further developed in a mirror cooling apparatus disclosed in the January 2002 issue of Sky and Telescope magazine, in an article entitled, "Thermal Management In Newtonian Reflectors", by Alan Adler, included in the form of Attachment 2 to the U.S. Provisional Patent Application 60/733,027 patent application. Adler discusses several approaches to utilizing a fan for enhancing cooling of the mirror of a reflector-type telescope, and recommends placement of one or more inlet fans in one side of the telescope tube in such a manner that air flow from the fan is directed at the front concave surface of the mirror, and exits out through the telescope tube through exit holes in the side of the telescope tube of a reflector-type telescope.

Greer also briefly address the problem of so called "tube currents," which are caused when a mirror, which is warmer than the ambient air, sets up an air flow down along one portion of the inner wall of the tube and back up another portion of the inner wall of the tube. These tube currents cause distortion of the periphery of the image.

Furthermore, although not specifically addressed in the articles by Greer or Adler, under certain conditions, such as where a ground fog exists, where a telescope has been stored and/or transported in an air-conditioned building or vehicle, or where the ambient temperature rises during a viewing session to a point where humid ambient air is at a higher temperature than the mirror, it is possible to encounter conditions where the mirror may initially be at a temperature lower than the ambient outdoor temperature, and perhaps even be enough lower that condensation may tend to occur on the reflective face of the mirror. Under such conditions, it may be desirable to direct ambient air around and across the mirror in such a manner that the mirror is actually being heated by the ambient air, in a manner allowing use of the telescope soon after it is set up outdoors, and with the goal of maintaining thermal equilibrium between the mirror and the ambient air during a viewing session.

While the approaches disclosed by Greer and Adler, to utilization of a fan for expedited cooling and management of a thermal boundary layer adjacent the concave face of a mirror provide some improvement in addressing the problems described above, inter alia, these and other prior approaches are not entirely satisfactorily, and further improvement is desirable. For example, with the approach advocated by Adler, of mounting the fan to blow directly on the concave reflecting surface of the mirror, the fan is also blowing dust, moisture or other contaminates directly onto the reflecting surface of the mirror, thereby requiring that extreme care be taken to keep the mirror free of contamination, and that frequent, undesirable cleaning of the mirror be performed to maintain optimal performance of the telescope.

It is also noted, by both Greer and Adler, that the mirror mounting arrangement, commonly known as a cell, can also substantially affect the time required for the mirror and cell structure to reach thermal equilibrium with the ambient air.

Directing air flow from a fan at or across the concave face of the mirror does little to help remove heat from the cell at an expedited rate.

It is desirable, therefore, to provide an improved method and apparatus for minimizing image distortion resulting from a thermal boundary layer adjacent the reflecting face of the mirror of a reflecting telescope, tube currents, and/or other impediments to clarity of image caused by lack of thermal equilibrium between the mirror of a reflecting telescope and the ambient air around the mirror, through judicious management of air flow across the reflecting face of the mirror, and through providing enhanced forced convection cooling and/or heating of the mirror and its related structures to bring the mirror into thermal equilibrium with the ambient air surrounding the mirror, at a rapid rate, and to maintain the mirror in thermal equilibrium with the ambient air while the telescope is in use.

BRIEF SUMMARY OF THE INVENTION

The invention provides an improved method and apparatus for improving image quality in a reflector-type telescope through utilization of one or more nozzles disposed about the periphery of a reflecting mirror of the telescope, for directing a flow of air from a backside of the mirror across a concave reflecting surface of the mirror. In some forms of the invention, supply nozzles are provided around a portion of the periphery of the mirror, and exhaust pick-up nozzles are provided around another portion of the periphery of the mirror, to thereby cause a flow of air to adhere more closely to the concave surface of the mirror than is achievable in prior approaches.

In some forms of the invention, one or more of the nozzles may include an inner wall extending from the periphery of the mirror, and an outer wall spaced from the inner wall of the nozzle. In some forms of the invention, having a telescope tube spaced radially outward from the periphery of the mirror, the outer wall of the nozzle may extend radially inward from an inner surface of the telescope tube.

In some forms of the invention, separate, oppositely directed, inflow and outflow fans are provided for generating a flow of supply air to the supply nozzle, and generating a suction for removing air through the exhaust pick-up nozzles. A divider may be provided between the inflow and outflow fans, to preclude short-circuiting of the air flow directly from the inflow to the outflow fan, without first traveling along the back of the mirror and across the concave reflecting surface. The divider may be provided in a flexible form which will perform the desired function of properly directing the air flow, while still allowing the position of the mirror and cell to be adjusted with regard to the mounting structure of the telescope.

In some forms of the invention, individual speed controls are provided for the inflow and outflow fans, to allow for fine tuning of the air flow across the concave surface of the mirror. In some forms of the invention, for example, one or both of the inflow and/or outflow fans may be operated at maximum speed, when the telescope is first moved to a location where the ambient air temperature is different from the temperature of the mirror, and then the speed of one or both of the fans may be reduced, as thermal equilibrium is approached, to preclude having the fans induce undesirable vibration into the telescope.

The inflow fan may also include an intake air scoop to preclude short-circuiting of air flow from the exit of the outflow fan to the inlet of the inflow fan. An air filter may be provided in the intake air scoop to preclude entry of dust, moisture, or other foreign matter into the air flow circuit of the telescope. The intake of the intake air scoop may be directed in such a manner that, when the telescope is angled such that the mirror is in close proximity to the ground, that the intake is not pulling air directly off of the ground, from beneath the telescope, but is rather pulling air in from beside the telescope.

The invention may take a variety of forms, including an apparatus or method for practicing the invention, or a method for manufacturing an apparatus, according to the invention.

An apparatus and/or method, according to the invention, effectively and efficiently sweep away the thermal gradient boundary layer, even during cool-down, and/or warm-up, of the mirror, so that the telescope may be used almost immediately when moved out side from an environment having an ambient temperature different from the outdoor ambient temperature. Although the image quality will continue to improve as the mirror temperature is brought into thermal equilibrium with the outdoor ambient air temperature, within 5 to 15 minutes after the invention establishes air flow across the concave surface of the mirror, image quality is typically so free of distortion that the further improvement occurring thereafter will be so small as to be undetectable to the eye of most observers.

Practice of the invention also provides an additional advantage, in that tube currents are reduced, further enhancing the clarity of the edge of the image, particularly during the period of time before the mirror temperature has been brought into close proximity to the temperature of the ambient air.

Furthermore, it has been noted that, due to the highly directed airflow provided by the invention, and the relatively low heat transfer capability of the glass mirror, after a very short period of operation of the invention, the reflecting surface of the mirror, which is often formed by a layer of highly thermally conductive aluminum, is rapidly brought to a temperature close to that of the ambient air, even though the remainder of the mirror may still be at a temperature different from the ambient air. In some forms of the invention this effect is enhanced by having the intake airflow, from intake fan, impinge directly upon the rear surface of the mirror and the cell, which provides for highly effective and efficient convective heat transfer to or from the mirror, that tends to achieve the majority of the heat transfer needed to bring the mirror into equilibrium through the backside of the mirror, rather than through the concave surface.

Other advantages, objectives, and features of the invention will be apparent upon consideration of the following detailed description of the invention, and associated illustrations and drawings.

BRIEF DESCRIPTION OF THE DRAWINGS

The accompanying drawings and attachments, incorporated into and forming a part of the specification, illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention.

DETAILED DESCRIPTION OF THE INVENTION

Figure 1:
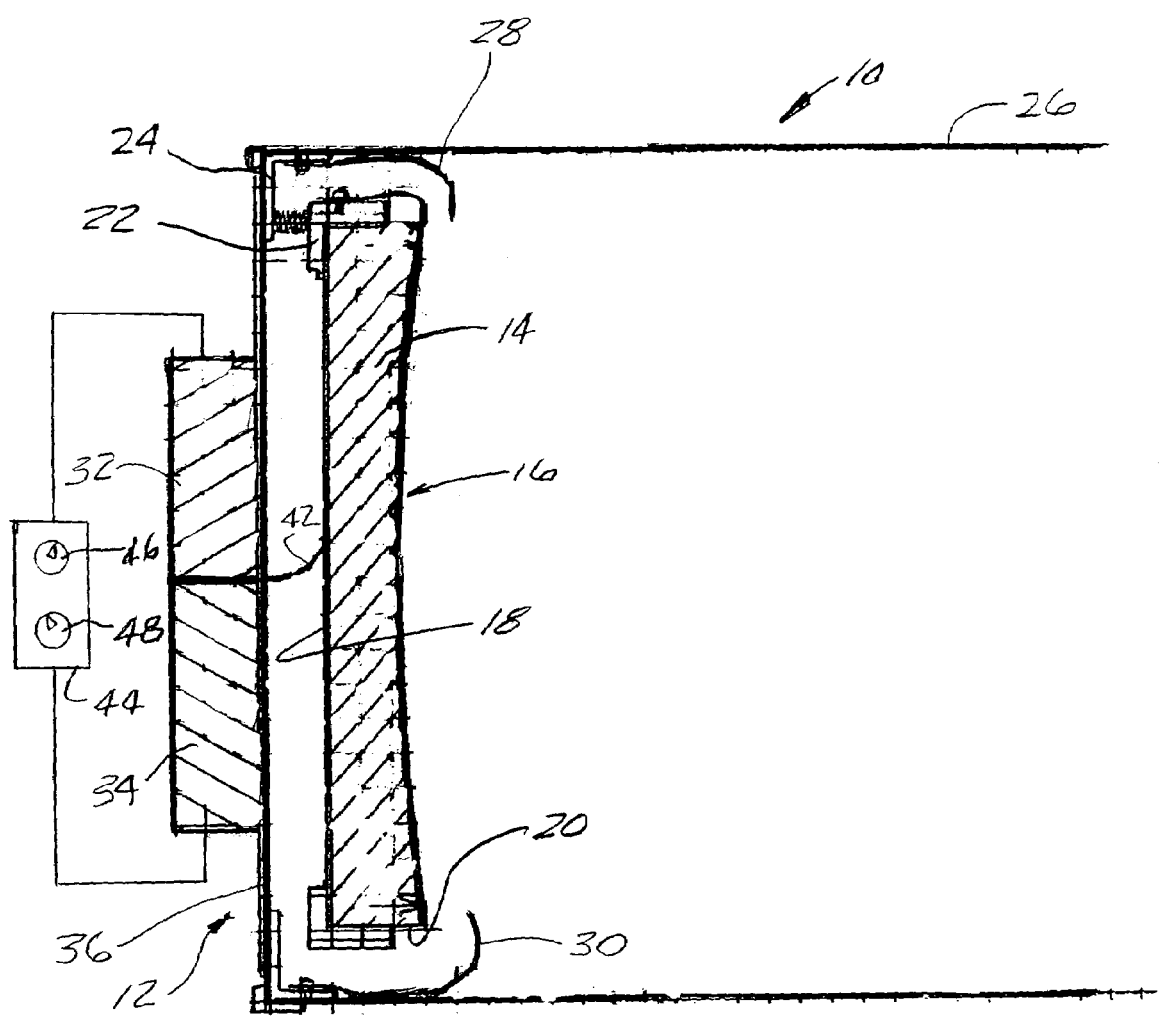
FIG. 1 is a schematic partial cross-section of an exemplary embodiment of a reflector telescope, according to the invention, including an apparatus for improving image quality in accordance with the invention.
Figure 2:
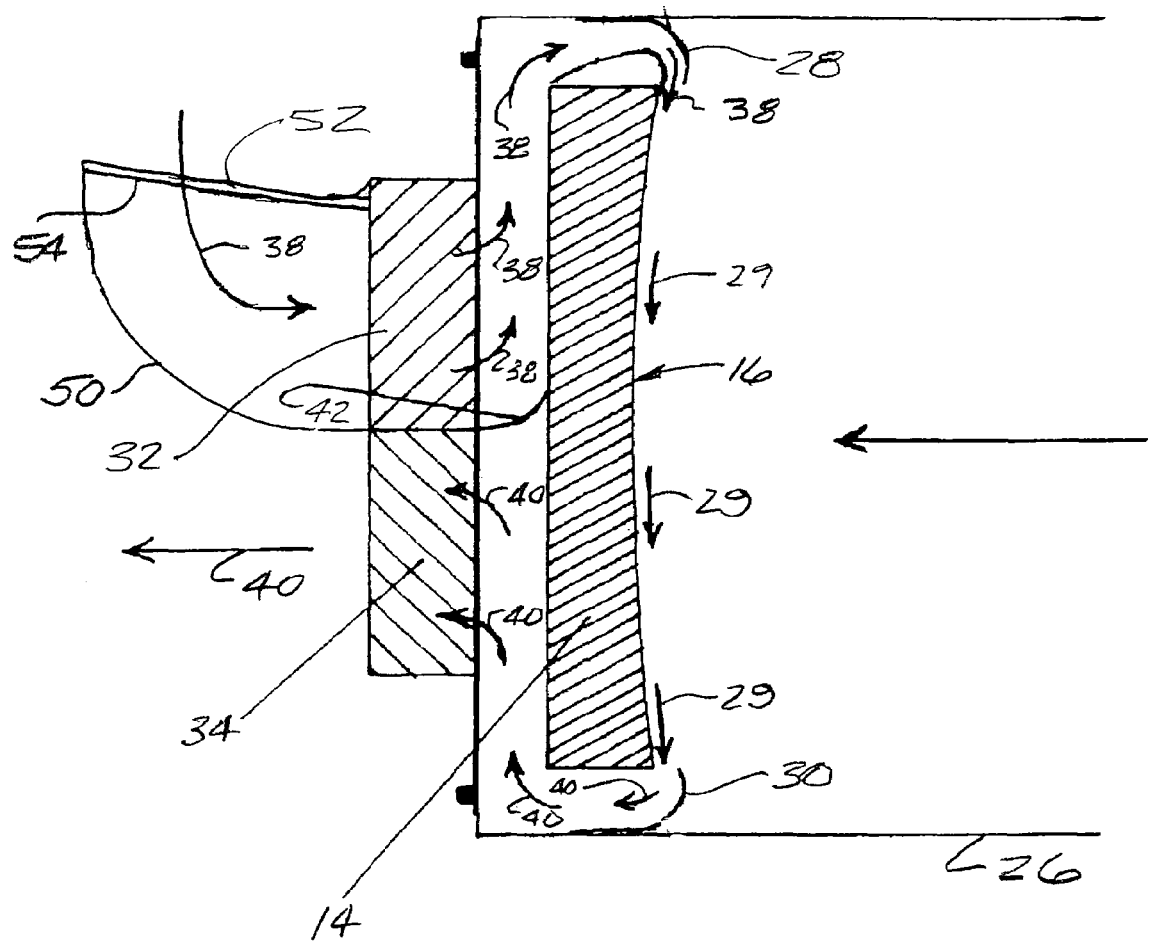
FIG. 2 illustrates the exemplary embodiment of the invention shown in FIG. 1, in a form having an inlet air scoop and inlet air filter, and with some of the elements and features of the exemplary embodiment, as illustrated in FIG. 1, deleted from FIG. 2, for clarity of illustration.
Figure 3:
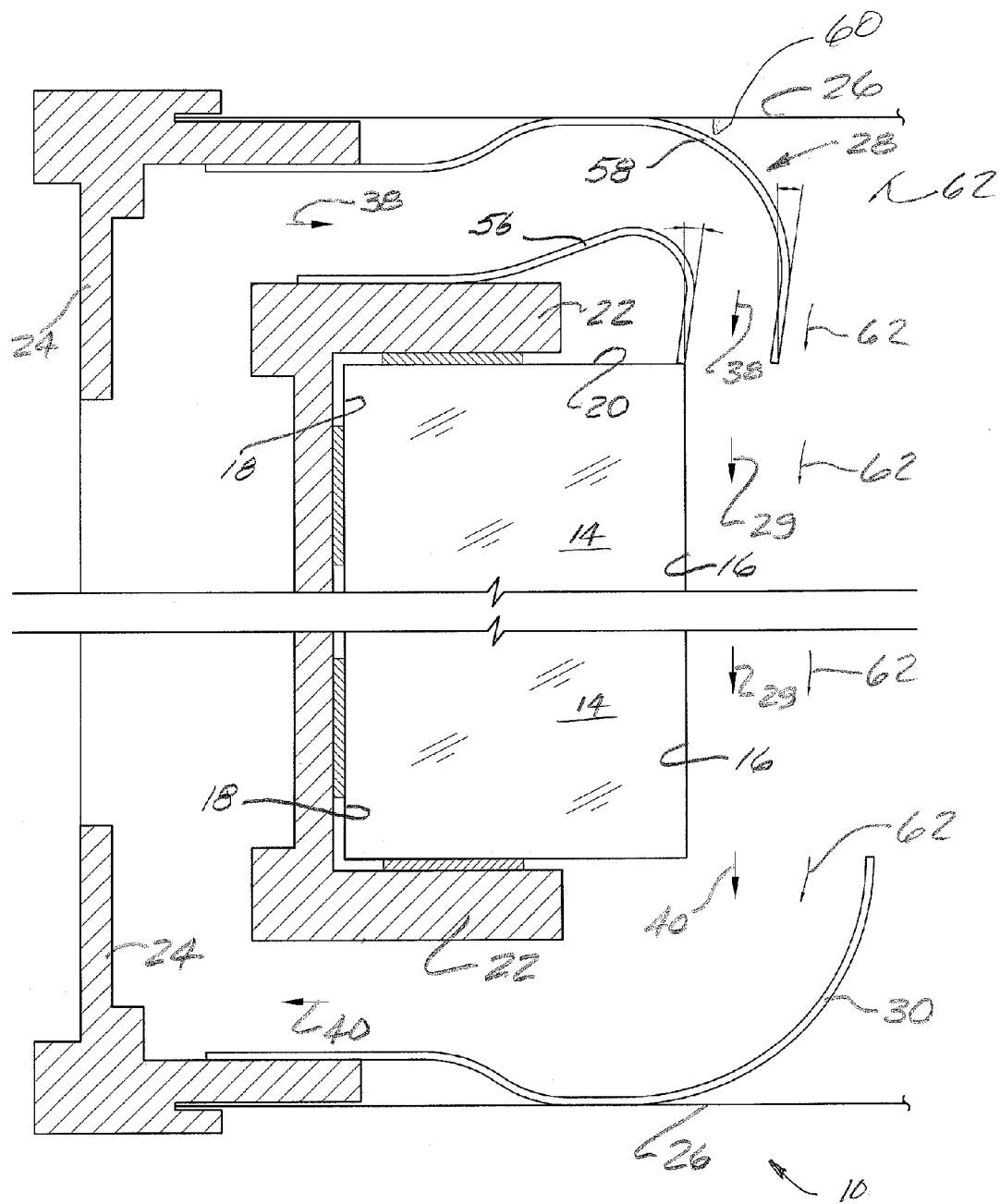
FIG. 3 is an enlarged, split, partial cross-section of the exemplary embodiment of the invention shown in FIGS. 1 and 2, illustrating construction details and operation of supply and pick-up nozzles of the exemplary embodiment of the apparatus for improving image quality.

FIGS. 1-3 show a first exemplary embodiment of the invention, in the form of a reflector telescope 10, including an apparatus 12 for improving image quality in the reflector telescope 10.

As best seen in FIG. 1, the exemplary embodiment of the reflector telescope 10 includes a mirror 14 having a front concave reflecting surface 16, a backside 18, and a periphery 20. The mirror 14 is mounted in a conventional adjustable cell arrangement 22, which is in turn adjustably attached to a bottom end 24 of a tube 26 of the telescope 0O.

The apparatus 12 for improving image quality, in the exemplary embodiment, includes a plurality of supply nozzles 28 disposed about the periphery 20 of the mirror 14, for directing a flow of air from the backside 18 of the mirror 14 across the concave reflecting surface 16 of the mirror 14, in the manner illustrated by arrows 38 and 29 in FIG. 2.

The apparatus 12 for improving image quality, in the exemplary embodiment of the telescope 10, also includes one or more exhaust pick-up nozzles 30 disposed about another portion of the periphery 20 of the mirror 14, for further facilitating the flow of air 29 across the front concave reflecting surface 16 of the mirror 14, in the manner illustrated in FIG. 2.

As shown in FIGS. 1 and 2, oppositely directed inflow and outflow fans 32, 34 are mounted on a mounting plate 36 attached to the bottom end 24 of the tube 26. The inflow fan 32 generates a flow of supply air, as indicated by arrows 38 to the supply nozzle 28. The outflow fan 34 generates a suction, as illustrated by arrows 40, for removing air through the exhaust pick-up nozzles 30.

A divider 42 is provided between the inflow and outflow fans 32, 34, to preclude short-circuiting of the air flow 38, 40 directly from the inflow to the outflow fan 32, 34, without first traveling along the backside 18 of the mirror 14, and across the concave reflecting surface 16. The divider 42, in the exemplary embodiment 10, is formed from a flexible material, such as plastic or thin metal, which will perform the desired function of properly directing the air flow 38, 40, along the backside 18 of the mirror 14, while still allowing the position of the mirror 14 and the cell 22 to be adjusted with regard to the mounting plate 36, the tube 26, and other mounting structures of the telescope 10.

As illustrated in FIG. 1, the exemplary embodiment of the apparatus 12 for improving image quality in the telescope 10 includes a controller 44 which is operatively connected for controlling the speed of the inflow and outflow fans 32, 34. The controller 44, in the exemplary embodiment 10 of the invention, includes individual speed controls, schematically illustrated in FIG. 1 by adjustable knobs 46 and 48, to allow for fine tuning of the air flow 29 across the concave surface 16 of the mirror 14. While practicing the invention, using the exemplary embodiment, for example one or both of the inflow and/or outflow fans 32, 34 may be operated at maximum speed, when the telescope 10 is first moved to a location where the ambient air temperature is different from the temperature of the mirror 14. Subsequently, the speed of one or both of the fans 32, 34 may be reduced, as thermal equilibrium is approached, to preclude having the fans 32, 34 induce undesirable vibration into the telescope 10. It is also contemplated, that in some embodiments of the invention, it may be desirable to resiliently mount the fans 32, 34 to the mounting plate 36, and/or to resiliently attach the mounting plate 36 to the bottom end 24 of the tube 26, to further preclude inducing undesirable vibration from the fans 32, 34 into the telescope 10.

As shown in FIG. 2, the exemplary embodiment of the reflecting telescope 10 may also include an intake air scoop 50 to preclude short-circuiting of the air flow 40 from the exit of the outflow fan to the inflow fan 32. An air filter 52 is attached at the inlet 54 of the intake air scoop 50, to preclude entry of dust, moisture, or other foreign matter into the air flow circuit 38, 29, 40, of the telescope 10. The inlet 54 of the intake air scoop 50 is directed toward the side of the tube 26, in such a manner that when the telescope 10 is angled such that the mirror 14 is in close proximate to the ground, the inlet 54 of the intake air scoop 50 is not pulling air directly off of the ground, from beneath the telescope 10, but is rather pulling air in from beside the telescope 10.

As shown in FIG. 3, the supply nozzles 28, in the exemplary embodiment 10, include an inner wall 56, extending from the periphery 20 of the mirror 14, and an outer wall 58 spaced from the inner wall 56 of the nozzle 28. In the exemplary embodiment 10, the tube 26 is spaced radially outward from the periphery 20 of the mirror 14, and the outer wall 58 of the nozzle 28 extends radially inward from an inner surface 60 of the telescope tube 26.

As best seen in FIG. 3, the inner and outer walls 56, 58 of the supply nozzle 28 may be configured to provide a curved path for directing and accelerating the inflow air 38 through the nozzle 28 and across the surface 16 of the mirror 14. As further illustrated in FIG. 3, portions of the inner and outer walls 56, 58 may be angled toward the concave surface 16, at the outlet of the nozzle 28, for facilitating generation of the flow of air 29 across the concave surface 16.

In similar fashion, the pick-up nozzle 30 may be curved to facilitate inducing the air flow 29 across the surface 16, and to improve efficiency in removing the air flow 29 after it has flowed across the concave surface 16.

As illustrated by airs 62 in FIG. 3, the flow of air 29 across the concave surface 16 of the mirror 14 may, under some conditions, induce a significant flow of air 62 down along the inner surface 60 of the tube 26, to thereby remove, or preclude formation of tube currents within the tube 26.

Those having skill in the art will readily recognize that the present invention provides significant advantages over the prior art, in enhancing image quality, and by substantially reducing the time required for achieving thermal equilibrium between the mirror of a reflector-type telescope and the ambient air surrounding the mirror, in a manner that is more practical to incorporate and operate than prior approaches to performing these functions.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents cited herein are hereby incorporated by reference to the same extent as if each reference were individually and specifically indicated to be incorporated by reference and were set forth in its entirety herein.

What is claimed is:

1. An apparatus for improving image quality in a reflector telescope having a mirror including a front concave reflecting surface, a backside, and a periphery thereof, the apparatus comprising:
    at least one supply nozzle disposed about a portion of the periphery of the mirror for directing a flow of air from the backside of the mirror across the concave reflecting surface of the mirror;
    at least one exhaust pick-up nozzle disposed about another portion of the periphery;
    an inflow fan operatively connected in communication with an inflow portion of the backside of the mirror and the at least one supply nozzle for providing a flow of air from the backside of the mirror, sequentially across the inflow portion of the backside of the mirror, around an inflow portion of the periphery of the mirror and out of the supply nozzle;
    an outflow fan operatively connected in communication with an outflow portion of the backside of the mirror and the at least one exhaust nozzle for generating a suction at the exhaust nozzle, for inducing a flow of air, sequentially across the concave reflecting face of the mirror; into the exhaust nozzle, around an outflow portion of the periphery of the mirror, across the outflow portion of the backside of the mirror, and out of the outflow fan; and
    a divider between the inflow and outflow fans for precluding short-circuiting of the air flow directly from the inflow to the outflow fan across the backside of the mirror without first traveling across the concave reflecting surface of the mirror.

2. The apparatus of claim 1, wherein, the mirror is mounted for adjustable movement in an adjustable cell arrangement, and the divider is formed of a flexible material which will perform the desired function of properly directing the air flow along the backside of the mirror while still allowing the position of the mirror and the cell to be adjusted.

3. The apparatus of claim 2, wherein the inflow fan has an inlet thereof and the outflow fan has an outlet thereof, and the apparatus further comprises, an intake air scoop connected in communication with an inlet of the inflow fan and having an inlet thereof configured and directed for precluding short-circuiting of air flow from the exit of the outflow fan to the inlet of the inflow fan.

4. The apparatus of claim 3, further comprising, an air filter attached at the inlet of the intake air scoop, to thereby preclude entry of dust, moisture, or other foreign matter into the intake air scoop.

5. A reflector telescope comprising:
    a mirror including a front concave reflecting surface, a backside, and a periphery thereof;
    an apparatus for improving image quality including at lease one supply nozzle disposed about a portion of the periphery of the mirror, for directing a flow of air from the backside of the mirror across the concave reflecting surface of the mirror;
    at least one exhaust pick-up nozzle disposed about another portion of the periphery;
    an inflow fan operatively connected in communication with an inflow portion of the backside of the mirror and the at least one supply nozzle for providing a flow of air from the backside of the mirror, sequentially across the inflow portion of the backside of the mirror, around an inflow portion of the periphery of the mirror and out of the supply nozzle;
    an outflow fan operatively connected in fluid communication with an outflow portion of the backside of the mirror and the at least one exhaust nozzle for generating a suction at the exhaust nozzle, for inducing a flow of air, sequentially across the concave reflecting face of the mirror; into the exhaust nozzle, around an outflow portion of the periphery of the mirror, across the outflow portion of the backside of the mirror, and out of the outflow fan; and
    a divider between the inflow and outflow fans for precluding short-circuiting of the air flow directly from the inflow to the outflow fan across the backside of the mirror without first traveling across the concave reflecting surface of the mirror.

6. The reflector telescope of claim 5, wherein, the mirror is mounted for adjustable movement in an adjustable cell arrangement, and the divider is formed of a flexible material which will perform the desired function of properly directing the air flow along the backside of the mirror while still allowing the position of the mirror and the cell to be adjusted.

7. The reflector telescope of claim 6, wherein the inflow fan has an inlet thereof and the outflow fan has an outlet thereof, and the apparatus further comprises, an intake air scoop connected in communication with an inlet of the inflow fan and having an inlet thereof configured and directed for precluding short-circuiting of air flow from the exit of the outflow fan to the inlet of the inflow fan.

8. The reflector telescope of claim 7, further comprising, an air filter attached at the inlet of the intake air scoop, to thereby preclude entry of dust, moisture, or other foreign matter into the intake air scoop.

9. A method for improving image quality in a reflector telescope having a mirror including a front concave reflecting surface, a backside, and a periphery thereof, the method comprising:
  directing a flow of air from the backside of the mirror across the concave reflecting surface of the mirror through at least one supply nozzle disposed about the periphery of the mirror;
  disposing the at least one supply nozzle about a portion of the periphery;
  disposing at least one exhaust pick-up nozzle about another portion of the periphery;
  operatively connecting an inflow fan in communication with an inflow portion of the backside of the mirror and the at least one supply nozzle for providing a flow of air from the backside of the mirror, sequentially across the inflow portion of the backside of the mirror, around an inflow portion of the periphery of the mirror and out of the supply nozzle;
  operatively connecting an outflow fan in communication with an outflow portion of the backside of the mirror and the at least one exhaust nozzle for generating a suction at the exhaust nozzle, for inducing a flow of air, sequentially across the concave reflecting face of the mirror; into the exhaust nozzle, around an outflow portion of the periphery of the mirror, across the outflow portion of the backside of the mirror, and out of the outflow fan; and
  operatively connecting a divider between the inflow and outflow fans for precluding short-circuiting of the air flow directly from the inflow to the outflow fan across the backside of the mirror without first traveling across the concave reflecting surface of the mirror.

10. The method of claim 9, wherein, the mirror is mounted for adjustable movement in an adjustable cell arrangement, and the method farther comprises, forming the divider of a flexible material which will perform the desired function of properly directing the air flow along the backside of the mirror while still allowing the position of the mirror and the cell to be adjusted.

11. The method of claim 10, wherein the inflow fan has an inlet thereof and the outflow fan has an outlet thereof and the method farther comprises, operatively connecting an intake air scoop in communication with an inlet of the inflow fan and configured and directed for precluding short-circuiting of air flow from the exit of the outflow fan to the inlet of the inflow fan.

* * * * *